Figure 1:
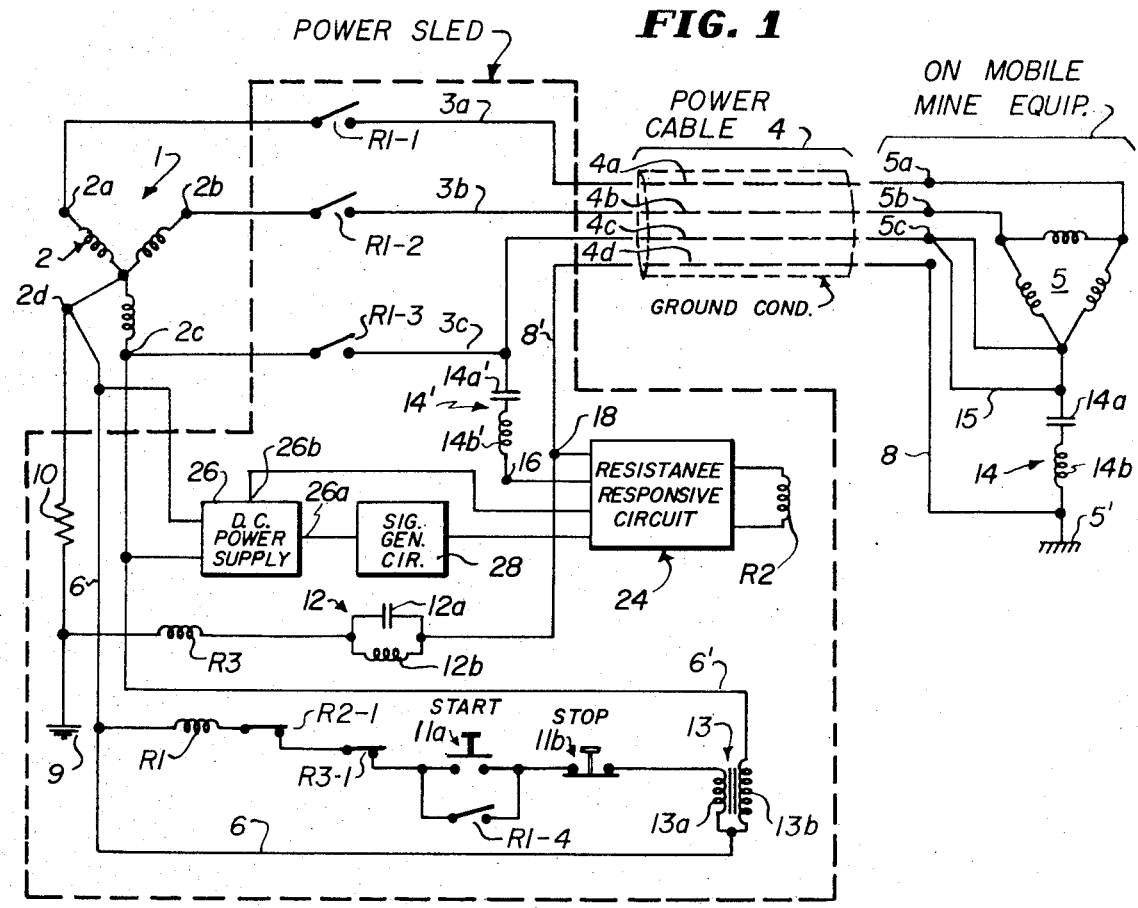

United States Patent
Agnew

[11] 3,728,582
[45] Apr. 17, 1973

[54] GROUND CONTINUITY MONITORING SYSTEM

[75] Inventor: Thomas I. Agnew, Irwin, Pa.

[73] Assignee: Gulton Industries Inc., Metuchen, N.J.

[22] Filed: Dec. 23, 1971

[21] Appl. No.: 211,449

[52] U.S. Cl. ..................... 317/18 C, 317/45, 317/53
[51] Int. Cl. ............................................. H02h 3/16
[58] Field of Search ................. 317/18 R, 18 A, 18 C, 317/53, 45; 324/51; 340/256

[56] References Cited

UNITED STATES PATENTS

| | | | |
|---|---|---|---|
| 3,072,827 | 1/1963 | Benish | 317/18 C |
| 3,496,416 | 2/1970 | Agnew et al. | 317/18 C |
| 3,273,017 | 9/1966 | Mathews | 317/28 R |
| 3,376,476 | 4/1968 | Porterfield et al. | 317/18 R |

*Primary Examiner*—James D. Trammell
*Attorney*—Wallenstein, Spangenberg, Hattis & Strampel

[57] ABSTRACT

In a system which delivers electrical power to remotely located electrical equipment, such as mining equipment, through power conductors in a cable extending from a main source of power to the equipment, the cable including at least two power conductors connected to the electrical input terminals of the equipment and a ground conductor connected to the frame of the equipment, there is added a ground conductor monitoring circuit including power circuit isolating means connected to one of the power conductors of the cable and the ground conductor thereof to provide across a pair of connecting terminals a series circuit including the cable ground conductor isolated from the main power circuit at a given frequency substantially different from the main power source frequency. These connecting terminals are preferably connected across the secondary winding of a transformer having a center tapped primary winding driven by push-pull connected transistors or the like fed by the oppositely phased outputs of a signal generator circuit at said given frequency. The push-pull transistor circuit includes a load resistance on one side of the load terminals thereof constituting one arm of a D.C. bridge circuit, and the load terminals and the primary winding of the transformer constituting the adjacent arm of the D.C. bridge circuit. Control means at the output of the bridge circuit is responsive to the output of the bridge circuit indicating that the impedance reflected into the primary winding exceeds a given value by disconnecting the main power source from the cable power conductors.

14 Claims, 2 Drawing Figures

GROUND CONTINUITY MONITORING SYSTEM

This invention relates to a cable monitoring system, and has one of its most important applications to a system for monitoring power cables extending to a mining vehicle carrying mining equipment.

The mining equipment on the mining vehicle which severs the mineral from the face of an underground mine is very commonly driven by one or more three phase electric motors which are supplied with electric power through power conductors in a cable trailing behind the vehicle. The power conductors of the cable commonly carry three phase alternating current (A.C.). The cable extends to a remote point which may be 500 to 5,000 feet or more from the mining vehicle where it terminates on another vehicle, referred to as a sled, which carries equipment which is most advantageously spaced a long distance from the face of the mine to minimize explosion hazards. It is apparent that there is a danger that the cable can be damaged to cause an open or short circuit in the conductors of the cable which would cause arcing of the high voltage conductors and thereby causing a serious explosion hazard. Where it is desired to minimize the possibility that a damaged cable will cause arcing, the power cable which normally includes a ground conductor (which may be supplied by the grounded sheath of the cable or by a separate conductor in the cable) generally connected to the frame of the mining equipment is sometimes additionally supplied with a separate monitoring conductor which together with the ground conductor forms a circuit for the flow of monitoring current generated by a signal generator operating at a frequency generally above the frequency of the main power source. When this monitoring current is interrupted or falls below a given level, interrupter contacts connected between the main power source and the cable power conductors are opened. The main disadvantage of this monitoring circuit is that it requires a special cable having, in addition to the usual power conductors and a ground conductor, a separate monitoring conductor which makes the cable more expensive to manufacture than a conventional cable without the additional monitoring conductor. Moreover, such a monitoring circuit cannot be readily added to an existing power system having a conventional cable.

The ground conductor of a conventional cable is often used as a means for detecting the presence of a short circuit between the frame of the mining or other equipment and one of the power conductors, which can create a very dangerous condition for the operator of the remote electrical equipment. Thus, it was customary to connect between the ground conductor connected to the frame of the remote electrical equipment and the main power source a control relay and a current limiting resistance to form a circuit wherein an undesired short circuiting of the frame of the electrical equipment to one of the power conductors will result in the flow of current through the control relay to effect the opening of the interrupter contacts referred to. However, this monitoring circuit could not detect the severance of or damage to the ground conductor, which would increase the apparent resistance of the ground conductor above a given limiting value.

One of the objects of the present invention is to provide a simple, reliable circuit for monitoring a cable, which has only one conductor (referred to as a ground or monitoring conductor) in addition to the main power conductors, by disconnecting the main source of power from the cable when the apparent resistance of the cable ground conductor exceeds a given limiting value.

Another object of the invention is to provision of a monitoring circuit as described which has also associated with the ground conductor a relay and current limiting resistor as described above which effects disconnection of the main power source from the cable when the frame of the remotE electrical equipment is short circuited to one of the power conductors of the cable, and which does not adversely affect the operation of the aforesaid monitoring circuit.

Another object of the invention is to provide a unique monitoring circuit as described which utilizes one of the power conductors, the ground conductor and one or more capacitors or tuned circuits including capacitors (which are D.C. isolating devices) as a path for the flow of monitoring current from a signal generator and wherein this path for flow of monitoring current is effective to vary an apparent D.C. resistance in an arm of a D.C. bridge circuit utilizing sensitive and reliable D.C. voltage sensing control circuits coupled to the output of the bridge circuit to effect the control operation described. A related object of the invention is to provide a monitoring circuit as just described, which for a given cost, has a maximum reliability or for a given degree of reliability has a minimum cost.

In accordance with the invention, one of the power conductors of the cable extending between a main source of power and a remote piece of electrical equipment and a cable ground conductor are interconnected at the remote end of the power cable by a frequency responsive impedance, such as by a series resonant circuit, which presents a low impedance to a given monitoring frequency, and a relatively high impedance to the frequency of the main power source (which frequency may be zero in the case of direct current or 60 cycles per second of the case of commercial alternating current). For maximum isolation of the monitoring circuit from the power conductors, it is also preferred to utilize a similar frequency responsive impedance connected between the inlet side of the power conductor of the cable and a connecting terminal which together with a connection to the inlet side of the ground conductor of the cable are connected to a resistance responsive circuit which, among other things, feeds a voltage from a signal generator operating at said monitoring frequency to its load circuit including said power and ground conductors and the frequency responsive impedances. The resistance responsive circuit is most preferably a D.C. bridge circuit in which the variation in impedance across said load circuit determines the variation in impedance across one of the arms of the bridge circuit.

Although in accordance with the broader aspects of the bridge circuit embodiment of the invention, the bridge circuit could be an A.C. bridge circuit, it is most advantageously a D.C. bridge circuit because of the desirability of reliable high gain D.C. integrated differential amplifier circuits which respond to the small variations in voltage across the bridge circuit. The interconnections between the above described monitoring current carrying load circuit and the D.C. bridge circuit is best achieved by the use of transformer coupling from a single ended or preferably a push-pull amplifier circuit driven from the output or outputs of a signal generator operating at the aforesaid monitoring frequency.

When a push-pull circuit is used, the load terminals of a pair of transistors or the like are connected to the opposite ends of a center tapped primary winding of a transformer whose secondary winding is connected across the input to the load circuit. The outputs of the signal generator circuit are preferably square wave signals of the opposite phase which alternately drive the transistors or the like into saturation. The center tap of the primary winding is connected to one of the input terminals of the bridge circuit and the load terminals of the transistors or the like remote from the center tap of the primary winding are connected to one of the output terminals of the bridge circuit. The D.C. input terminals of the bridge circuit also constitute the source of D.C. voltage for operating the push-pull amplifier circuit.

The push-pull circuit produces an effective constant D.C. impedance across one of the arms of the D.C. bridge circuit. The D.C. control circuit connected to the output terminals of the bridge circuit responds to the voltage output conditions of the circuit which indicate that the apparent ground conductor resistance exceeds the limiting value thereof preferably by disconnecting the main source of power from the power conductors of the cable.

Figure 2:
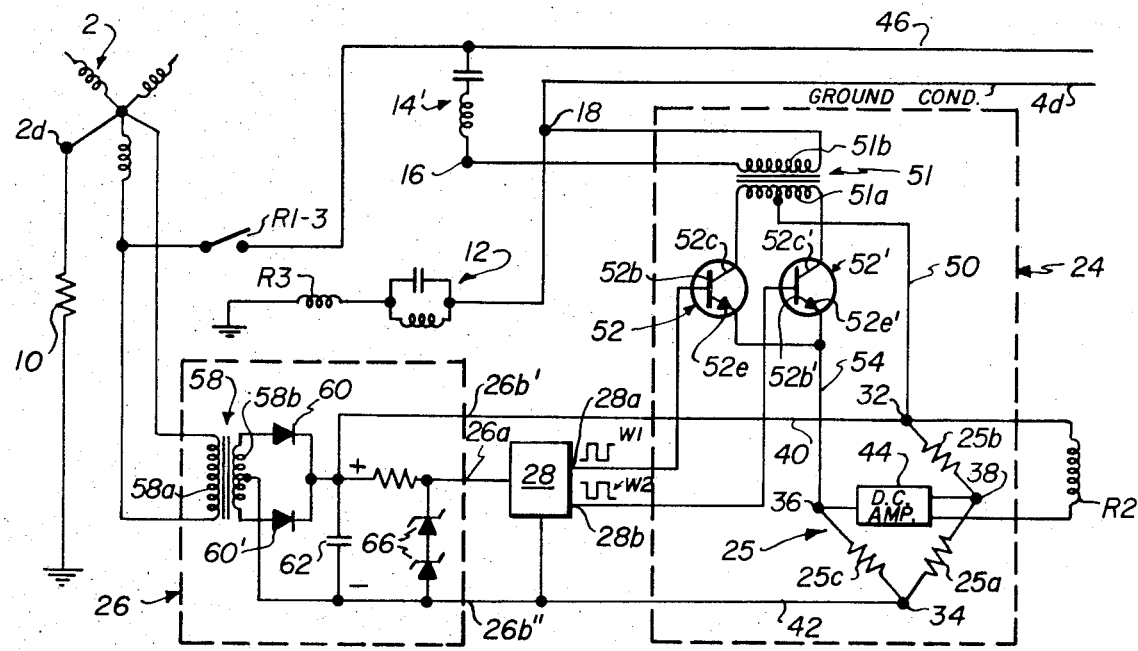

The above and other objects, features and advantages of the invention will become apparent upon making reference to the specification to follow, the claims and the drawings wherein:

FIG. 1 is a diagram of a three phase power system upon which is juxtaposed the ground continuity of cable fault monitoring system of the present invention, with some of the components shown in block form; and FIG. 2 shows the circuit diagram of the preferred circuitry for some of the components shown in block form in FIG. 1.

Refer now more particularly to FIG. 1 which illustrates the invention applied to a system for supplying power from a main source of power 1 to one or more electric motors which drive mining equipment on a mobile vehicle carrying the mining equipment. (The delta connected field windings 5 of one of the motors is illustrated in FIG. 1.) The more or less conventional portions of an exemplary three phase power system for operating the mining equipment will first be described.

A source of three phase A.C. power 1 is shown and comprises a Y-connected three phase transformer having secondary windings 2 whose respective main terminals 2a, 2b and 2c are connected through interrupter contacts R1-1, R1-2 and R1-3 and associated conductors 3a, 3b and 3c to the power conductors 4a, 4b and 4c of the power cable 4 extending to the input terminals 5a, 5b and 5c of one of the electric motors. (It should be understood, however, that the present invention is applicable to single phase A.C. and D.C. power systems.) The cable also has a ground conductor 4d connected by a conductor 8 to the frame 5' of the mining vehicle and the electric motor. The cable 4 trails rearwardly from the mining vehicle and terminates at a vehicle, referred to in the mining industry as a power sled, on which the various control equipment connected to the input side of the cable 4 shown in FIG. 1 are carried. The control equipment on the power sled is enclosed by dashed lines in FIG. 1.

The interrupter contacts R1-1, R1-2 and R1-3 can be controlled in any suitable way, such as by a relay or control coil R1 operated by a control circuit 7. When the control coil R1 is energized, the interrupter contacts are closed. One end of the control coil R1 is shown connected to a common conductor 6 extending to a terminal 2d of the transformer secondary windings 2 which connects with the juncture point of the Y-connected windings of the transformer. The other end of the control coil R1 is shown connected in series with normally closed contacts R2-1 of a relay R2 and normally closed contacts R3-1 controlled by a relay R3. Normally-closed contacts R3-1 are connected to one end of the primary winding 13a of a transformer 13 through normally-open start pushbutton contacts 11a and normally-closed stop pushbutton contacts 11b whose pushbuttons are accessible to an operator on the power sled. The start pushbutton contacts 11a are shunted by a set of normally-open holding contacts R1-4 which close upon energization of the interrupter coil R1. The other end of the secondary winding 13a and one end of the secondary winding 13b of the transformer 13 are connected to the aforementioned common conductor 6. The other end of the secondary winding 13b is connected by a conductor 6' to one of the main output terminals 2c of the three phase transformer 1. The transformer 13 is a step down transformer to provide a relative low A.C. voltage for the control circuit 7. It is apparent that upon closure of the start pushbutton contacts 11a, the control coil R1 will become energized and locked-in upon closure of the holding contacts R1-4. This will result in the closure of the interrupter contacts R1-1, R1-2 and R1-3. Opening of the stop pushbutton contacts 11b will break the holding circuit for the control coil R1 to de-energize the same and open the interrupter contacts R1-1, R1-2 and R1-3.

The relay R3 forms part of a circuit which disconnects power from the inlet side of the cable 4 upon the undesired short circuiting of the frame 5' of the mining equipment to a power conductor. To this end, one end of the relay R3 is preferably connected to earth ground 9 and to a current-limiting resistor 10 connected to the aforementioned input terminal 2d of the three phase transformer 1 connected to the juncture point of the secondary windings of the three phase transformer 1. The other end of the relay R3 is connected through a frequency responsive impedance network 12 (added to assist in the operation of the present invention to be described) to a conductor 8', extending to the inlet side of the cable ground conductor 4d which, as previously indicated, is connected by the conductor 8 to the frame 5' of the mining vehicle. The network 12 offers a very high impedance to the preferably relatively high frequency of the monitoring circuit to be described (e.g. 4 K.C.), and a very low impedance to the frequency of the main power source. As illustrated, the network 12 is a parallel tuned circuit comprising a capacitor 12a and an inductance 12b tuned to the relatively high monitoring frequency. The frame 5' of the mining vehicle, which is normally unconnected to any other portion of the circuit, is shown connected to a frequency responsive impedance network to be described forming part of the present invention. If the frame 5' becomes inadvertently short circuited to any of the power conductors associated with the electric motor involved, appreciable current at the main power line frequency which is usually 60 cycles per second, will flow through the relay R3 thereby energizing the same. Energization of the relay R3 will open the set of normally closed contacts R3-1 to de-energize the control circuit 7 and the control coil R1.

In accordance with the present invention, the conductor 8 and the frame 5' of the mining vehicle, instead of being normally disconnected from any of the power conductors, is connected to one of the motor input terminals 3c connected to cable power conductor 4c through the aforesaid frequency responsive impedance network 14, which in the preferred form of the invention is a series resonant circuit comprising an inductanct 14b and a capacitor 14a tuned to the monitoring frequency. Such a series resonant offers a very high impedance to the main power source frequency so that the network 14 isolates the cable ground conductor from current of the latter frequency flowing through the cable power conductors 4a, 4b and 4c. There is thus formed between the inlet side of the cable power conductor 4c and the cable ground conductor 4d a series monitoring circuit in which only significant current at the monitoring frequency can circulate, the series circuit including the cable power conductor 4c, the series resonant circuit 14 and the cable ground conductor 4d. For further isolating the monitoring circuit from the main power system, in the most preferred form of the invention, a second frequency responsive impedance network 14' is provided which is connected between the inlet side of the ground conductor 4d and a connecting terminal 16. The frequency responsive impedance network 14' may be, as illustrated, a series resonant circuit comprising a capacitor 14a' and an inductance 14b' which is resonant to the monitoring frequency. The connecting terminal 16 and a connecting terminal 18 on the conductor 8' extending to the inlet side of the cable ground conductor 4d is connected to a resistance responsive circuit 24.

The resistance responsive circuit 24 is most advantageously, although not necessarily, a bridge circuit to be described which responds to a variation in resistance of the series monitoring circuit including the frequency responsive impedance networks 14—14', the cable power conductor 4c and the cable ground conductor 4d. If the cable ground conductor 4d should become open or the resistance thereof should increase beyond a given limiting value cause, for example, by a damaged or broken cable, the resistance responsive circuit 24 will operate to effect the opening of the interrupter contacts R1-1, R1-2 and R1-3. To this end, as illustrated, the circuit 24 will energize the aforementioned relay R2 which in turn opens its set of the normally-closed contacts R2-1 forming part of the aforementioned control circuit 7, to de-energize the control coil R1 and effect the opening of the interrupter contacts.

The outputs of a signal generator circuit 28 operating at the monitoring frequency is connected to the resistance responsive circuit 24 in which there are connections to the aforementioned connecting terminals 16 and 18 and which couples the output of the signal generator circuit 28 to the connecting terminals 16 and 18 so that current at the monitoring frequency signal circulates in the aforementioned series monitoring circuit. In the case where the resistance responsive circuit 24 is a bridge circuit, this bridge circuit is most preferably a D.C. bridge circuit indicated by reference numeral 25 in FIG. 2 and soon to be described. Accordingly, as illustrated in FIG. 1, a D.C. power supply 26 operating from connections to the three phase transformer 1 produces a D.C. voltage at an output 26b thereof which is connected to the resistance responsive circuit 24. The D.C. power supply 26 also has an output 26a for energizing the signal generator circuit 28.

The frequency responsive impedance network 12 in series with the aforementioned relay R3 maximizes the impedance at the monitoring frequency of that part of the power system which is connected in parallel with the aforementioned connecting terminal 16 and 18, which could have a shunting effect on the monitoring circuit described, and also aids in isolating other monitoring circuits operating with other cables extending to other mining vehicles which are energized from the same three phase transformer 1.

Refer now to FIG. 2 which illustrates the most advantageous form of the resistance responsive circuit 24. The circuit 24 comprises a very unique D.C. bridge circuit 25 which responds to the variation in resistance in the series monitoring circuit described in which alternating current flows at the monitoring frequency.

The D.C. bridge circuit 25 has a pair of output terminals 36-38 and a pair of input terminals 32-34 respectively connected by conductors 40-42 to a pair of D.C. output terminals 26b'—26b' of the D.C. power supply 26. In the circuit illustrated, the D.C. output terminal 26b' is positive with respect to the D.C. output terminal 26b''. The bridge circuit 25 has a resistance arm 25a connected between the negative bridge input terminal 34 and the bridge output terminal 38, and a resistance arm 25 b connected between the bridge output terminal 38 and the positive bridge input terminal 32. The bridge circuit further has a resistance arm 25c connected between the negative bridge input terminal 34 and the other bridge output terminal 36. The positive bridge input terminal 32 is connected by conductor 50 to the center tap point of a primary winding 51a of a transformer 51 whose secondary winding 51b is respectively connected across the aforementioned connecting terminals 16-18 associated with the series monitoring circuit including the impedance responsive networks 14'—14 and the cable power and ground conductors 4c-4d. The opposite ends of the center tapped primary winding 51a are respectively connected to the collectors 52c—52c' of NPN transistors 52—52'. The emitters 52a — 52a ' of the transistors 52—52' are connected together and through a conductor 54 to the output terminal 36 of the bridge circuit 25. the bases 52—52b' of the transistors 52—52' are connected by conductors 56—56' to the outputs 28a —28b of the signal generator circuit 28.

In the most preferred form of the invention, the signal generator circuit 28 provides respectively at the outputs 28a–28b square wave signals W1 and W2 of opposite phase and at the aforementioned monitoring frequency. The amplitudes of these signals are most advantageously sufficient to drive transistors 52—52' into saturation during alternate half cycles. Thus, current flows in opposite directions through the two halves of the primary winding 51a of the transformer 51, wherein successive half cycles generate an alternating signal in the secondary winding 51b at the monitoring frequency. Thus, either the transistor 52 or 52' is conductive at any instant, so the bridge circuit sees D.C. or steady state voltage and current conditions across the terminals 36 and 32.

As in the case of any transformer coupled amplifier circuit, the current flow through the transistors 52—52' is determined by the effective load resistance involved which is that resistance of the load circuit (which is constituted by the aforementioned frequency responsive impedance networks 14—14', and the cable power and ground conductors 4c—4d) reflected into the primary winding of the transformer involved. Thus, as the resistance of the series monitoring circuit increases, the flow of current through the transistors 52—52' proportionately decreases, which provides an apparent decreasing D.C. resistance across the terminals 36-32 of the bridge circuit 25. As this apparent resistance varies, the voltage conditions at the output terminals 36-38 of the bridge circuit 25 will, accordingly, vary. A D.C. amplifier 44, which is preferably a high gain differential amplifier circuit, compares or responds to the difference in voltage at the output terminals 36-38 of the bridge circuit 25, and when this voltage difference indicates that the resistance of the series monitoring circuit exceeds a given limiting value, the amplifier 44 energizes the aforementioned relay R2 (in any well known manner as in similar differential amplifier relay control circuits of the prior art) to effect opening of the interrupter contacts R1-1, R1-2 and R1-3.

It is apparent that the present invention provides an exceedingly reliable and sensitive means for monitoring continuity of a power cable including only one conductor in addition to the power conductors. Thus, the monitoring circuit described can operate with a conventional cable including such a ground or other conductor not carrying the current of the power source involved.

It should be understood that numerous modifications may be made to the most preferred form of the invention described above without deviating from the broader aspects of the invention.

I claim:

1. In a system which delivers electrical power from a main source of power to remotely located electrical equipment having a pair of energizing input terminals through a cable having at least one pair of power conductors coupled to said energizing input terminals and a monitoring conductor, and interrupter contact means connected between said main source of power and at least one of said cable power conductors, the improvement in means for operating said interrupter contact means to terminate the flow of power from said main source of power to said electrical equipment when the apparent resistance of said monitoring conductor exceeds a given value, said means comprising: a signal generator at the main power inlet side of said cable for producing an output of a given frequency different from the frequency of the output of said main power source, frequency responsive impedance means which substantially excludes the flow of current from said main source of power and presents a low impedance to the output of said signal generator, means forming a circuit across a pair of resistance responsive circuit connecting terminals which circuit includes in mutual series circuit relation said one cable power conductor, said cable monitoring conductor and said frequency responsive impedance means, and a resistance responsive circuit at the power inlet side of the cable including transformer means having primary winding means of and secondary winding means, said secondary winding means being coupled across said resistance responsive circuit connecting terminals, means coupling the output of said signal generator to said primary winding means, and means responsive to the change in reflected impedance from said secondary winding means into said primary winding means for opening said interrupter contact means for a reflected impedance indicating an apparent resistance of said monitoring conductor which exceeds said given value.

2. In a system which delivers electrical power from a main source of power to remotely located electrical equipment having a pair of energizing input terminals through a cable having at least one pair of power conductors coupled to said energizing input terminals and a monitoring conductor, and interrupter contact means connected between said main source of power and at least one of said cable power conductors, the improvement in means for operating said interrupter contact means to stop the flow of power from said main source of power to said electrical equipment when the apparent resistance of said monitoring conductor exceeds a given value, said means comprising: a signal generator at the main power inlet side of said cable for producing an output of a given frequency different from the frequency of the output of said main power source; frequency responsive impedance means including a D.C. voltage blocking capacitive means which substantially excludes the flow of current from said main source of power and presents a low impedance to the output of said signal generator; means forming a circuit across a pair of resistance responsive circuit connecting terminals which circuit includes in mutual series circuit relation said one cable power conductor said cable monitoring conductor and said frequency responsive impedance means; a reflected resistance responsive circuit including transformer means having primary winding means and secondary winding means, said secondary winding means being coupled across said resistance responsive circuit connecting terminals, a source of D.C. voltage, current control means having load terminal means and control terminal means which control the flow of current through the load terminal means in accordance with the signal fed thereto when a source of D.C. voltage is coupled across the load terminal means, means connecting the output of said signal generator to said control terminal means to generate a signal in said primary winding means coupled through said secondary winding means to said circuit across said resistance responsive circuit connecting terminals, means coupling said load terminal means, said primary winding means and said source of D.C. voltage in mutual series circuit relation so a control signal fed to said control terminal means will control the flow of current through said load terminal means, and means responsive to the change in current flow through said load terminal means due to the change in reflected impedance from said secondary winding means into said primary winding means for opening said interrupter contact means for a reflected impedance indicating an apparent resistance of said monitoring conductor which exceeds said given value.

3. The power system of claim 2 wherein said reflected resistance responsive circuit is a bridge-forming circuit having a pair of input terminals connected across said source of D.C. voltage, a pair of output terminals, a first resistance arm connected between one of said bridge input terminals and one of said bridge output terminals, a second resistance arm connected between the other of said bridge input terminals and said one bridge output terminal, a third resistance arm connected between said other bridge input terminal and the other bridge output terminal, said load terminal means of said current control means and said primary winding means constituting a fourth arm of said bridge circuit coupled between said other bridge output terminal and said one bridge input terminal, and control means coupled across said bridge output terminals for opening said interrupter contact means when the voltage conditions at said bridge output terminals indicates that the apparent resistance of the cable monitoring conductor exceeds said given value.

4. The power system of claim 3 wherein said current control means are a pair of current control devices each having a pair of load terminals and a control terminal, said primary winding means is a center-tapped primary winding where the center tap point is connected to said one bridge input terminal and the opposite ends of said primary winding are respectively coupled to the corresponding load terminals of said current control devices, the other load terminals of said current control devices being coupled together and to said other bridge output terminal, said signal generator having a pair of output terminals at which respectively appear signals at said given frequency 180° out of phase, said output terminals of said signal generator are respectively connected to the control terminals of said current control devices which are Class B operated thereby, so the devices are rendered alternately conductive in the same direction during successive half cycles, to provide a substantially continuous D.C. current flow in the connection between said center tap point of said primary winding and said one bridge input terminals.

5. The power system of claim 4 wherein said current control devices are transistors of the same type, and the signal at said output terminal of said signal generator drive the transistors into saturation.

6. The power system of claim 5 wherein the output signals at the signal generator are square wave signals.

7. The power system of claim 2 wherein said electrical equipment has a frame, and said cable monitoring conductor is grounded to said frame.

8. The power system of claim 7 wherein said frequency responsive impedance means comprises a first frequency responsive impedance means coupled between the power outlet end of said cable power conductor and the corresponding end of said cable monitoring conductor.

9. In a system which delivers electrical power from a main source of power to remotely locate electrical equipment having at least one pair of energizing input terminals and conductive frame means through a cable having at least one pair of power conductors coupled to said pair of energizing input terminals and a ground conductor connected to said frame means, and interrupter contact means connected between said main source of power and at least one of said cable power conductors, the improvement in means for operating said interrupter contacts to terminate the flow of power from said main source of power to said electrical equipment when the apparent resistance of said conductor exceeds a given resistance value, said means comprising: a signal generator at the main power inlet side of said cable for producing an output of a given frequency different from the frequency of the output of said main power source, frequency responsive impedance means which excludes the flow of current from said main source of power and presents a low impedance to the output of said signal generator, means forming a circuit across a pair of connecting terminal means which circuit includes in mutual series circuit relation said one cable power conductor, said cable monitoring conductor and said frequency responsive impedance means, the output of said signal generator being coupled to said connecting terminal means; and a resistance bridge-forming circuit at the inlet side of said cable, said resistance bridge-forming circuit including a pair of input terminals extending to a source of energizing voltage and a pair of output terminals, a first resistance arm connected between one of said bridge input terminals and one of said bridge output terminals, a second resistance arm connected between the other of said bridge input terminals and said one bridge output terminal, a third resistance arm connected between said other bridge input terminal and the other bridge output terminal, and means coupling the latter bridge output terminal and said one bridge input terminal between said connecting terminal means so that voltage across said output terminals of said resistance bridge-forming circuit varies with the cable ground conductor resistance; and means coupled across the bridge output terminals for opening said interrupter contacts when the voltage conditions at said bridge output terminal indicates that the ground conductor resistance exceeds said given value.

10. The power system of claim 9 wherein said frequency responsive impedance means comprise a first frequency responsive impedance means coupled between the power outlet end of said cable power conductor and the corresponding end of said cable monitoring conductor and a second frequency responsive impedance means coupled between the inlet end of said cable power conductor and one of said resistance responsive circuit connecting terminal means.

11. The power system of claim 9 wherein said electrical equipment has a frame, and said cable monitoring conductor is grounded to said frame.

12. The power system of claim 11 wherein said frequency responsive impedance means comprises a first frequency responsive impedance means coupled between the power outlet end of said cable power conductor and the corresponding end of said cable ground conductor.

13. In a system which delivers electrical power from a main source of power, having at least a pair of output terminals across which a source of voltage appears, to remotely located electrical equipment having at least one pair of energizing input terminals and a grounded conductive frame, through a cable having at least one pair of power conductors coupled to said energizing input terminals of said electrical equipment and a ground conductor connected to the frame of said electrical equipment, interrupter contact means connected between at least one of said output terminals of said main source of power and at least one of said cable power conductors, and an interrupter contact control circuit including control means for opening said interrupter contact means when energized, current limiting means and means coupling said control means and said current limiting impedance means in series between the power inlet side of said cable ground conductor and a terminal of said main source of power, wherein a short circuit between the frame of said electrical equipment and one of said power conductors will result in the flow of current through said control means which will effect the opening of said interrupter contact means, the improvement comprising: a signal generator and the inlet side of said cable for producing an output of a given frequency different from the frequency of the output of said main power source; frequency responsive impedance means coupled between the power outlet end of said cable power conductor and the corresponding end of said cable which excludes the flow of current from said main source of power and presents a low impedance to the output of said signal generator; and a resistance responsive circuit coupled across the power inlet ends of said one cable power conductor and said cable ground conductor and to the output of said signal generator, wherein the output of said signal generator is coupled through said resistance responsive circuit to the power inlet ends of said one cable power conductor and said cable ground conductor, said resistance responsive circuit being responsive to the presence of impedance conditions across the power inlet ends of said one cable power conductor and said cable ground conductor indicating an undesirably high load resistance by effecting the opening of said interrupter contact means.

14. The system of claim 13 wherein there is provided frequency responsive impedance means connected in series with said control means for providing a relatively high impedance at the frequency of the output of said signal generator and a very low impedance to the output of said main source of power.

* * * * *